United States Patent
Krause

(10) Patent No.: US 8,179,923 B2
(45) Date of Patent: May 15, 2012

(54) SYSTEM AND METHOD FOR TRANSMITTING REAL-TIME-CRITICAL AND NON-REAL-TIME-CRITICAL DATA IN A DISTRIBUTED INDUSTRIAL AUTOMATION SYSTEM

(75) Inventor: Karl-Heinz Krause, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/788,533

(22) Filed: May 27, 2010

(65) Prior Publication Data

US 2010/0232430 A1 Sep. 16, 2010

Related U.S. Application Data

(60) Division of application No. 12/243,906, filed on Oct. 1, 2008, now Pat. No. 8,064,482, which is a continuation of application No. 09/790,998, filed on Feb. 22, 2001.

(30) Foreign Application Priority Data

Nov. 24, 2000 (DE) .................................. 100 58 524

(51) Int. Cl.
*H04J 1/02* (2006.01)
*H04B 7/212* (2006.01)
*H04L 12/28* (2006.01)
*H04L 12/56* (2006.01)

(52) U.S. Cl. ......... 370/493; 370/494; 370/400; 370/442
(58) Field of Classification Search .................. 370/254, 370/324, 362, 389, 400, 401, 412, 425, 442, 370/493, 494, 495, 498, 503, 519
See application file for complete search history.

(56) References Cited

FOREIGN PATENT DOCUMENTS
WO PCT/US99/18984 * 8/1999
WO PCT/US99/14083 * 1/2000
* cited by examiner

*Primary Examiner* — Kwang B Yao
*Assistant Examiner* — Adam Duda

(57) ABSTRACT

A system and a method provide a real-time-critical communication and a non-real-time-critical communication in a switched data network consisting of users and switching units, for example a distributed automation system, by a cyclic operation. In a transmission cycle, there exists for all users and switching units of the switched data network in each case at least one section for transmitting real-time-critical data and at least one section for transmitting non-real-time-critical data, as a result of which the real-time-critical communication is separated from the non-real-time-critical communication. Since all users and switching units are always synchronized to a common time base, the respective sections for transmitting data in each case take place at the same time for all users and switching units, i.e. the real-time-critical communication takes place independently in time from the non-real-time-critical communication.

4 Claims, 4 Drawing Sheets

SYSTEM AND METHOD FOR TRANSMITTING REAL-TIME-CRITICAL AND NON-REAL-TIME-CRITICAL DATA IN A DISTRIBUTED INDUSTRIAL AUTOMATION SYSTEM

CROSS REFERENCE TO RELATED APPLICATIONS

This application is a divisional application of U.S. application Ser. No. 12/243,906 filed Oct. 1, 2008 now U.S. Pat. No. 8,064,482. The U.S. application with Ser. No. 12/243,906 is a continuation application of U.S. application Ser. No. 09/790,998 filed Feb. 22, 2001. This application claims priority of German patent application No. 10058524.8 DE filed Nov. 24, 2000. All of the applications are incorporated by reference herein in their entirety.

FIELD OF INVENTION

The invention relates to a system and a method for the parallel transmission of real-time-critical and non-real-time-critical data via switched data networks, especially the Ethernet.

BACKGROUND OF INVENTION

Data networks provide for the communication between a number of users due to the networking, that is to say the connection of the individual users to one another. Communication here means the transmission of data between the users. The data to be transmitted are sent out as data telegrams, i.e. the data are packed together to form a number of packets and are sent via the data network to the corresponding receiver in this form. They are, therefore, also called data packets. The term transmission of data is used completely synonymously to the above-mentioned transmission of data telegrams or data packets in this document. The question of networking itself is solved, for example in the case of switched high-performance data networks, especially the Ethernet, by in each case at least one switching unit being connected between two users which is connected to both users. Each switching unit can be connected to more than two users. Each user is connected to at least one switching unit but not directly to another user. Users are, for example, computers, stored program systems (SPS) or other machines which exchange, especially process, electronic data with other machines. In contrast to bus systems in which each user can reach any other user of the data network directly via the databus, the switched data networks are exclusively point-to-point connections, i.e. a user can only reach all other users of the switched data network indirectly by corresponding forwarding of the data to be transmitted by means of one or more switching units.

In distributed automation systems, for example in the field of drive engineering, certain data must arrive at certain times at the users intended for them and must be processed by the receivers. These are called real-time-critical data or data traffic since any untimely arrival of the data at the destination leads to unwanted results at the user. According to IEC 61491, EN61491 SERCOS interface-brief technical description, a successful real-time-critical data traffic of the abovementioned type can be guaranteed in distributed automation systems.

SUMMARY OF INVENTION

It is an object of the invention to specify a system and a method for transmitting data via switched data networks, especially the Ethernet, which provides for mixed operation of real-time-critical and non-real-time-critical data communication, especially Internet- or Intranet-based data communication, in the same data network.

The teachings hereinbelow extend to those embodiments which fall within the scope of the appended claims, regardless of whether they accomplish one or more of the above-mentioned needs.

This object is achieved by a method for transmitting data via switched data networks, especially the Ethernet, in the field of industrial systems, in which real-time-critical and non-real-time-critical data are transmitted, the switched data network being set up between at least two users, especially a transmitter and a receiver, the data being transmitted in at least one transmission cycle with adjustable period, each transmission cycle being subdivided into at least one first section for the transmission of real-time-critical data for real-time control and at least one second section for the transmission of non-real-time-critical data.

This object is achieved by a system for transmitting data via switched data networks, especially the Ethernet, in the field of industrial systems, comprising at least one data processing device which can be coupled to a data network and which transmits real-time-critical and non-real-time-critical data, the switched data network being set up between at least two users, especially a transmitter and a receiver, the system exhibiting means for transmitting data in at least one transmission cycle with adjustable period, each transmission cycle being subdivided into at least one first section for transmitting real-time-critical data for real-time control and at least one second section for transmitting non-real-time-critical data.

The invention is based on the finding that an open, Internet-based communication is spontaneous communication, i.e. that both the time of such type of communication and the volume of data arriving which must be transferred during communication cannot be determined in advance. As a result, collisions on the transmission lines in the case of bus systems or in the switching units in the case of switched high-speed networks, especially Fast Ethernet or Switched Ethernet, are not impossible. To be able to utilize the advantages of the Internet communication technology also in real-time communication in switched data networks in the field of automation engineering, especially drive engineering, mixed operation of real-time communication with other spontaneous non-real-time-critical communication, especially Internet communication, is desirable. This is made possible by the fact that the real-time communication which occurs predominantly cyclically in the fields of application considered here and can thus be planned in advance is strictly separated from the non-real-time-critical communication, especially the open, Internet-based communication, which, in contrast, cannot be planned.

Communication between the users is effected in transmission cycles, each transmission cycle being subdivided into at least one first section for transmitting real-time-critical data for real-time control, for example of the industrial systems provided therefor, and at least one second section for transmitting non-real-time-critical data, especially in open, Internet-capable communication. An especially advantageous embodiment of the invention is characterized by the fact that each user is allocated a switching unit which is provided for transmitting and/or receiving and/or forwarding the data to be transmitted.

An extremely advantageous embodiment of the invention is characterized by the fact that all users and switching units of the switched data network always exhibit a common synchronous time base due to mutual timing synchronization. This is the prerequisite for separating the plannable real-time communication from the non-real-time-critical communication which cannot be planned. Separation of the plannable real-time communication and the unplannable non-real-time-critical communication is guaranteed by applying the method for time synchronization in accordance with application DE 10004425.5 which has not been previously published. By permanently applying this method also during active operation of a distributed automation system, all users and switching units of the switched data network are always synchronized to a common time base which, in consequence, means the same starting point and the same length of each transmission cycle for all users and switching units. Since all real-time-critical data transmissions are known before the actual data transmission due to the cyclic operation, and, therefore, can be planned in advance, it is ensured that the real-time communication can be controlled for all users and switching units in such a manner that no disturbances, for example collisions, occur in the data transmission of the real-time-critical data telegrams themselves and all planed critical data transfer times are maintained precisely.

Another especially advantageous embodiment of the invention is characterized by the fact that all non-real-time-critical data which are intended to be transmitted during the section of a transmission cycle which is provided for the real-time critical communication are temporarily stored by the respective switching unit and are transmitted during the section of this or a subsequent transmission cycle which is intended for the non-real-time-critical communication, i.e. any unplanned Internet communication which may occur in the first section of a transmission cycle which is reserved for the real-time communication is shifted into the second section of the transmission cycle which is reserved for the spontaneous non-real-time-critical communication as a result of which disturbances of the real-time communication are completely prevented. The corresponding data of the spontaneous non-real-time-critical communication are temporarily stored by the switching unit affected in each case and are only transmitted in the second section of the transmission cycle which is reserved for the spontaneous, non-real-time-critical communication after the section for the real-time communication has expired. This second section, i.e. the total period up to the end of the transmission cycle, is available to all users for the non-real-time-critical communication, especially Internet communication, which cannot be planned, also without influencing the real-time communication since this is performed separately in time.

Collisions with the real-time-critical data telegrams in the switching units can be prevented by all non-real-time-critical data which cannot be transmitted during the section of a transmission cycle intended for the transmission of the non-real-time-critical data being temporarily stored by the respective switching unit and transmitted during the section of a later transmission cycle which is intended for the transmission of the non-real-time-critical data.

A further advantageous embodiment of the invention is characterized by the fact that the period of the section for the transmission of non-real-time-critical data within a transmission cycle is automatically established by the period of the section for the transmission of real-time-critical data. The advantage of this arrangement is that in each case it is only the necessary transmission time for the real-time-critical data traffic which is used and the remaining time is automatically available for the non-real-time-critical communication, for example for the Internet communication which cannot be planned or, respectively, other non-real-time-critical applications. It is especially advantageous that the period of the section for the transmission of real-time-critical data within a transmission cycle is in each case determined by the data to be transmitted in a connection-oriented manner, i.e. the period of the two sections is determined for each individual data connection by the volume of data of the real-time-critical data to be transmitted, which is necessary in each case, as a result of which the division of the two sections and thus the time available for the non-real-time-critical communication is optimized for each transmission cycle for each individual data connection between two switching units.

A further advantageous embodiment of the invention is characterized by the fact that the period of a transmission cycle is established at least once before the respective data transmission takes place. This has the advantage that, as a result, the period of a transmission cycle can be matched to the respective requirements for real-time communication or, respectively, for the open Internet-capable communication with each start of a new data transmission planned in advance. Naturally, it is also possible that the period of a transmission cycle and/or the period of the section for the transmission of real-time-critical data of a transmission cycle can be changed depending on requirement, for example at preplanned fixed times and/or after a planned number of transmission cycles, advantageously before the beginning of a transmission cycle, by switching to other planned real-time-critical transmission cycles. The period of a transmission cycle is advantageously between one microsecond and ten seconds depending on the application.

Another extremely advantageous embodiment of the invention is characterized by the fact that the real-time communication can be newly planned at any time during active operation of an automation system which guarantees a flexible adaptation of the real-time control to boundary conditions changing at short notice. This also makes it possible to change the period of transmission cycle.

A further advantageous embodiment of the invention is characterized by the fact that a part of the section of the transmission cycle intended for the transmission of real-time-critical data is intended for the transmission of data for the organization of the data transmission. It has been found to be of special advantage in this connection that the data telegrams for the organization of the data transmission are transmitted at the beginning of the section for the transmission of real-time-critical data of the transmission cycle. Data for the organization of the data transmission are, for example, data for the timing synchronization of the users and switching units of the data network, data for recognizing the topology of the network, etc.

A further advantageous embodiment of the invention is characterized by the fact that, for all real-time-critical data telegrams to be transmitted, the transmitting and receiving time at the transmitter and/or receiver, and in all switching units involved in each case all times for forwarding the real-time-critical data telegrams and the respective associated links via which the real-time-critical data telegrams are forwarded are noted before the beginning of the respective performance of the data transmission, i.e. it is noted in a switching unit when and to which output port a real-time-critical data telegram arriving at time X is to be forwarded.

A further extremely advantageous embodiment of the invention is characterized by the fact that the forwarding times are planned in such a manner that each real-time-critical data telegram arrives at the corresponding switching unit at the latest at the forwarding time or earlier but is in any case only forwarded at the forwarding time. This eliminates the problem of timing uncertainties which becomes noticeable especially in the case of long transmission chains. As a result, the real-time-critical data telegrams can be transmitted or forwarded immediately, without time interval, i.e. poor utilization of the bandwidth in the case of real-time data packets is prevented. Naturally, it is also possible to insert transmission gaps between the transmission of the individual data packets if necessary.

A further advantage of the time-based forwarding is that finding the destination is no longer address-based in the switching unit since it is clear from the start which port is the forwarding destination. This provides for optimum utilization of all existing links within the switched data network. Redundant links of the switched data network which must not be used for the address-based switching through of the non-real-time-critical communication because otherwise there would be circularities of data packets, however, can be taken into consideration in advance for the planning of the forwarding links and can thus be used for the real-time communication. This makes it possible to implement redundant network topologies, e.g. rings for error-tolerant real-time systems. Data packets can be transmitted redundantly on disjoint paths and there are no circularities of data packets. A further advantage of the preplanned forwarding is that, in consequence, the monitoring of each link section is possible without acknowledgement and error diagnostics can thus be performed in a simple manner.

Another extremely advantageous embodiment of the invention is characterized by the fact that at least one arbitrary user, especially a user having the capability for open Internet-capable communication, with or without associated switching unit, can be added to a switched data network and it is then ensured that critical data transfers are successfully performed at the desired time even if the arbitrary user performs a non-real-time-critical communication, especially an Internet communication in parallel with a real-time-critical communication.

Another especially advantageous embodiment of the invention is characterized by the fact that a switching unit is integrated in a user. This results in an extraordinary cost advantage compared with the switching units, also called switches, previously always implemented as independent modules.

A further advantageous embodiment of the invention is characterized by the fact that a switching unit exhibits two separate accesses to the respective user, one access being provided for the exchange of real-time-critical data and the other access being provided for the exchange of non-real-time-critical data. This has the advantage that real-time-critical and non-real-time-critical data are processed separately. The access for the non-real-time-critical data corresponds to the commercially available interface of a regular Ethernet controller, as a result of which the preexisting software, especially the drivers, can be used without restriction. The same applies to the preexisting software for a non-real-time-capable data network.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF INVENTION

Figure 1:
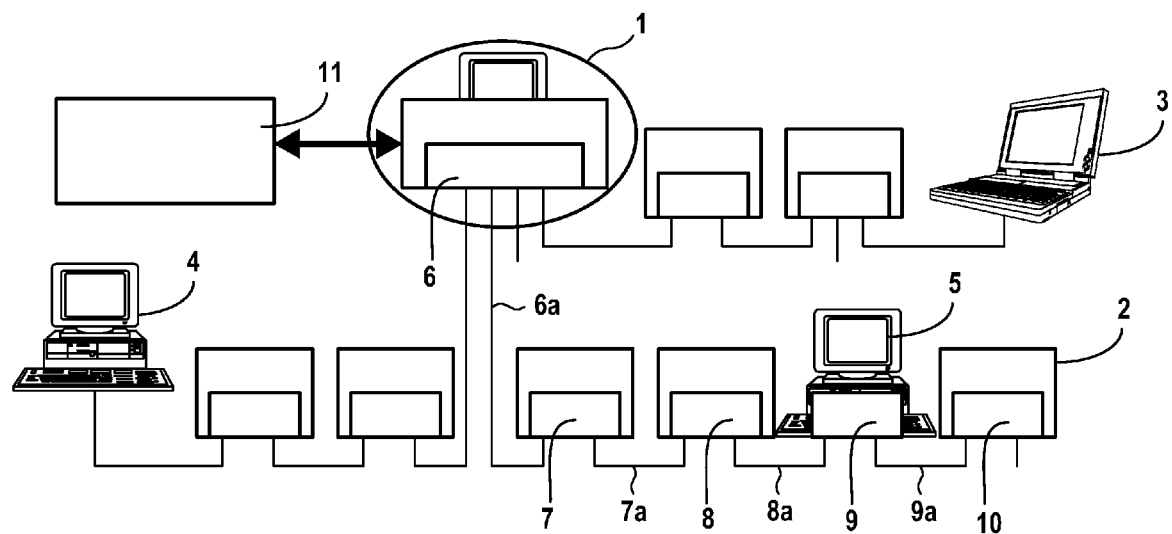
FIG. 1 shows a diagrammatic representation of an exemplary embodiment of a distributed automation system.

FIG. 1 shows a diagrammatic representation of an exemplary embodiment of a distributed automation system, the switching unit in each case already being integrated in the respective user as part of the invention for reasons of clear representation. In contrast, the prior art sees each of the switching units, here already integrated in the relevant local user, as a separate device which is in each case connected between two users. Integrating the respective switching unit in a user is more inexpensive and easier to maintain.

The automation system shown consists of a number of users which can be constructed both as transmitter and as receiver at the same time, for example of a control computer 1, a number of drives in which only drive 2 is designated for reasons of clear representation, and other computers 3, 4, 5 which are connected to one another to faun a switched data network, especially the Ethernet, by means of connecting cables, especially Ethernet cables, in the case of which only connections 6*a*, 7*a*, 8*a*, 9*a* are designated for reasons of clear representation. The switching units which are typical of the topology of an Ethernet and in the case of which only switching units 6, 7, 8, 9, 10 are designated for reasons of clear representation, are already integrated in the respective users in this representation The switching units are used for transmitting and/or receiving and/or forwarding the data to be transmitted.

Control computer 1 is connected, for example, additionally to an in-house communication network, for example the Intranet 11 and/or the worldwide communication network Internet 11. The control computer 1 transmits real-time-critical data, for example for controlling drive 2 via connections 6*a*, 7*a*, 8*a*, 9*a*. These real-time-critical data must be processed by drive 2 precisely at time X since otherwise unwanted effects occur, such as, e.g. a delayed start of drive 2, which disturb the operation of the automation system. The real-time-critical data are in each case forwarded by switching units 6, 7, 8, 9 up to switching unit 10 which transfers them to the receiver drive 2 which processes the data at time X. In the prior art, a successful real-time-critical data traffic of the abovementioned type can be guaranteed if, in addition, no other arbitrary communication, for example Internet communication, is performed by computer 5 at the same time. In this case, Internet communication at the same time by computer 5, computer 5 requests, for example, an Internet page. These non-real-time-critical data are forwarded via connections 8*a*, 7*a*, 6*a* by means of switching units 9, 8 and 7 to switching unit 6 which transfers the data to computer 1 which, finally, delivers the corresponding request to the Internet 11 and sends back the response in the reverse order to computer 5 via the same connections and switching units. The response thus uses the same path as the real-time-critical communication. As a result, a waiting situation may occur in the switching units involved and the real-time-critical data may no longer arrive on time at drive 2. It is, therefore, no longer possible to guarantee error-free real-time operation with the prior art. Application of the disclosed invention, in contrast, provides for any non-real-time-critical communication in parallel with the real-time communication in the same data network without disturbing the real-time communication. This is indicated by the connection of computers 3 and 4 in which no switching unit is integrated and which are integrated into the automation system shown by means of a direct Ethernet connection. Computers 3 and 4 do not participate in the real-time communication but only in the spontaneous, Internet-capable non-real-time-critical communication without disturbing the real-time communication.

The invention is based on the concept that real-time-critical and non-real-time-critical communication in switched data networks are separated from one another in such a manner that the non-real-time-critical communication does not exert any disturbing influence on the real-time-critical communication. The prerequisite for this separation is, on the one hand, that all users and switching units of the switched data network always have a common synchronous time base due to mutual timing synchronization. This is also guaranteed in the active operation of a distributed automation system by permanent application of the method for timing synchronization according to application DE 10004425.5, not previously published. The second prerequisite for the separation is that the real-time-critical communication can be planned which is given by the fact that the real-time communication occurs cyclically in the fields of application considered here, especially drive engineering, i.e. a data transmission takes place in one or more transmission cycles.

Figure 2:
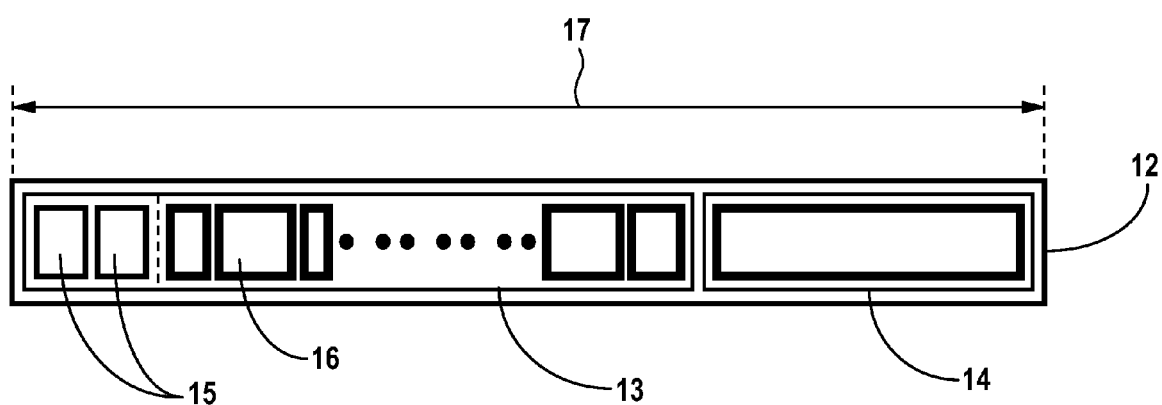
FIG. 2 shows the basic structure of a transmission cycle.

FIG. 2 shows by way of example the instance of a basic structure of a transmission cycle which is divided into two sections. A transmission cycle 12 is divided into a first section 13 which is intended for the transmission of real-time-critical data and a second section 14 which is intended for the transmission of non-real-time-critical data. The length of the transmission cycle 12 shown symbolizes its duration 17 in time which advantageously is between one microsecond and ten seconds depending on the application. The period 17 of a transmission cycle 12 is changeable but is established at least once before the time of data transmission, for example by the control computer 1, and has the same length in each case for all users and switching units of the switched data network. The period 17 of a transmission cycle 12 and/or the period of the first section 13 which is intended for the transmission of real-time-critical data can be changed at any time, for example at preplanned fixed times and/or after a planned number of transmission cycles, advantageously before the beginning of a transmission cycle 12, by the control computer 1 switching, for example, to other planned real-time-critical transmission cycles. In addition, the control computer 1 can newly plan the real-time communication at any time during the active operation of an automation system, depending on requirement, as a result of which the period 17 of a transmission cycle 12 can also be changed. The absolute period 17 of a transmission cycle 12 is a measure of the proportion of time or, respectively, the bandwidth of the non-real-time-critical communication during a transmission cycle 12, that is to say the time which is available for the non-real-time-critical communication. Thus, the non-real-time-critical communication has, for example, a bandwidth of 30% with a period 17 of a transmission cycle 12 of 500 µs and a bandwidth of 97% with 10 ms. In the first section 13 which is intended for the transmission of real-time-critical data, a certain period is reserved for transmitting data telegrams for the organization of the data transmission 15 before the transmission of the actual real-time-critical data telegrams of which only the data telegram 16 is designated for reasons of clarity. The data telegrams for the organization of the data transmission 15 contain, for example, data for the timing synchronization of the users and switching units of the data network and/or data for recognizing the topology of the network. After these data telegrams have been sent, the real-time-critical data telegrams or, respectively, the data telegram 16 are transmitted. Since, due to the cyclic operation, the real-time communication can be planned in advance, the transmitting times or, respectively, the times for forwarding the real-time-critical data telegrams are known for all real-time-critical data telegrams of a transmission cycle 12, or, respectively, the data telegram 16 to be transmitted, before the beginning of the data transmission, i.e. the period of the section 14 for the transmission of non-real-time-critical data is automatically established by the period of the section 13 for transmitting real-time-critical data. The advantage of this arrangement is that in each case only the transmission time needed for the real-time-critical data traffic is used and after this has ended, the remaining time is automatically available for the non-real-time-critical communication, for example for the Internet communication, which cannot be planned, or other non-real-time-critical applications. It is especially advantageous that the period of the section 13 for transmitting real-time-critical data is in each case determined by the data to be transmitted in a connection-oriented manner, i.e. the period of the two sections is determined by the volume of data of the real-time-critical data to be transmitted which is in each case necessary for each individual data connection, as a result of which the division of section 13 and section 14 in time can differ for each individual data connection for each transmission cycle 12. In each case only the necessary transmission time for the real-time-critical data traffic is used and the remaining time of a transmission cycle 12 is automatically available for the non-real-time-critical communication, for example for an Internet communication which cannot be planned or, respectively, other non-real-time-critical applications for all users of the switched data network. Since the real-time communication is correspondingly planned in advance in such a manner that the arrival of the real-time-critical data telegrams in the corresponding switching units is planned in such a manner that the real-time-critical data telegrams considered, for example data telegram 16, arrive at the corresponding switching units at the forwarding time at the latest or earlier, the real-time-critical data telegrams or, respectively, data telegram 16 can be transmitted or forwarded without time interval so that the available period is used in the best possible way due to the densely packed transmission or forwarding. Naturally, it is also possible to insert transmission gaps between the transmission of the individual data telegrams if necessary.

Figure 3:
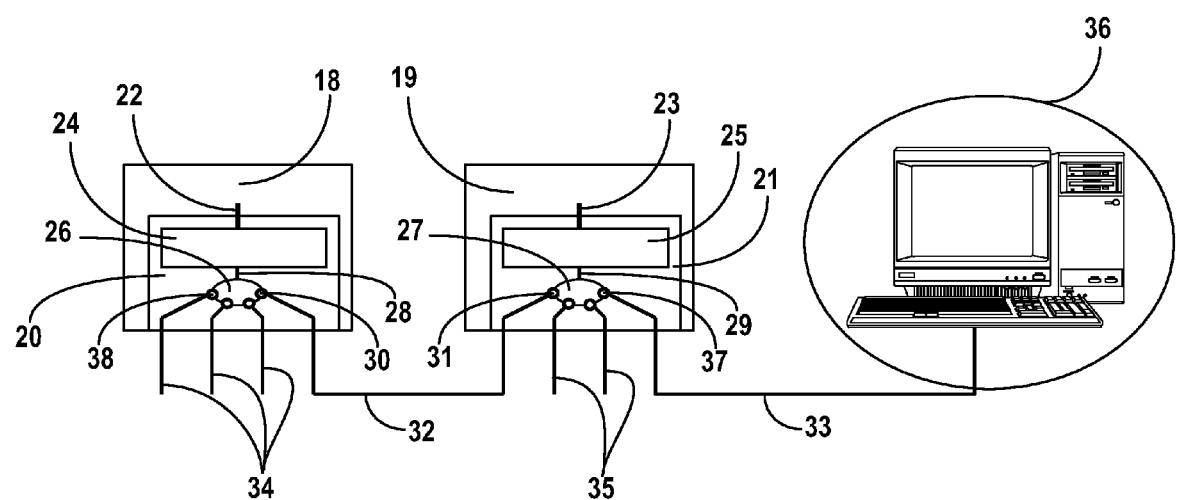
FIG. 3 shows the basic operation in a switched network.

FIG. 3 shows the basic operation in a switched network. Representative of a network, a user 18, for example a drive, and a user 19, for example a control computer, are shown, having in each case integrated switching units 20, 21 and a further user 36 without switching unit which are connected to one another by the data connections 32, 33. In this arrangement, the switching unit 20 is connected to the switching unit 21 via the external port 30, the data connection 32 and the external port 31. The other external ports shown on the switching units 20, 21 have not been designated for reasons of clarity of the illustration. Other users with or without integrated switching unit have also not been shown for reasons of clarity of the illustration. Data connections 34, 35 to other users and coming from the switching units 20, 21 shown are only indicated. Switching units 20, 21 in each case have local memories 24, 25 which are connected to users 18, 19 via the internal interfaces 22, 23. The users 18, 19 exchange data with the corresponding switching units 20, 21 via the interfaces 22, 23. The local memories 24, 25 are connected to the processors 26, 27 within the switching units 20, 21 via the data connections 28, 29. The processors 26, 27 receive data or, respectively, forward data via the internal data connections 28, 29 from and, respectively, to the local memories 24, 25 or via one or more of the external ports, for example port 30 or port 31. The switching units 20, 21 always have a common synchronous time base due to the application of the method of timing synchronization. If user 19 has real-time-critical data, these are fetched by the processor 27 via the interface 23, the local memory 25 and the connection 29 during the section for the real-time-critical communication at the preplanned time and are transmitted from there to the switching unit 20 via the intended external port, for example port 31. If user 36 transmits non-real-time-critical data, for example for an Internet request, at the same time, that is to say during the real-time-critical communication, via the data connection 33, these data are received by the processor 27 via the external port 37 and forwarded via the internal connection 29 to the local memory 25 where they are temporarily stored. From there, they are only retrieved in the section for the non-real-time-critical communication and forwarded to the receiver, i.e. they are shifted into the second section of the transmission cycle which is reserved for the spontaneous non-real-time critical communication which eliminates disturbances in the real-time-communication. In the case where not all non-real-time-critical data temporarily stored can be transmitted during the section of a transmission cycle intended for the transmission of the non-real-time-critical data, they are temporarily stored in the local memory 25 of the switching unit 21 until they can be transmitted during a section of a later transmission cycle which is intended for the transmission of the non-real-time-critical data, which eliminates disturbances of the real-time communication in every case.

The real-time-critical data telegrams which arrive at the processor 26 of the switching unit 20 via data connection 32 via the external port 30 are immediately forwarded via the corresponding external ports. This is possible since the real-time communication is planned in advance and, therefore, the transmitting and receiving time for all real-time-critical data telegrams to be transmitted, all switching units involved in each case and all times for the forwarding and all receivers of the real-time-critical data telegrams are known, i.e. it is noted, for example, in processor 26 of the switching unit 20 that the real-time-critical data telegrams arriving at time X are to be forwarded to the next switching unit via external port 38. Due to the advance planning of the real-time communication, it is also ensured that there will be no data collisions, for example on data connection 34 from port 38. Naturally, the same applies to all other data connections or, respectively, ports during the real-time communication. The forwarding times of all real-time-critical data packets from the switching units involved in each case are also preplanned and thus unambiguously established. The arrival of the real-time-critical data telegrams, for example in processor 26 of the switching unit 20, is planned in such a manner, therefore, that the real-time-critical data telegrams considered arrive in the processor 26 of the switching unit 20 at the latest at the switching time or earlier. This eliminates the problem of timing uncertainties which become noticeable, in particular, in the case of long transmission chains. Data which are intended, for example, for user 18 and have been temporarily stored in the local memory 24 of the switching unit 20 are retrieved from the latter at a given time, real-time-critical data are retrieved at the preestablished times and non-real-time-critical data are retrieved during the section intended for them.

In consequence, as stated above, a simultaneous operation of real-time-critical and non-real-time-critical communication in the same switched data network and an arbitrary connection of additional users to the switched data network are possible without disturbing the real-time communication itself.

Figure 4:
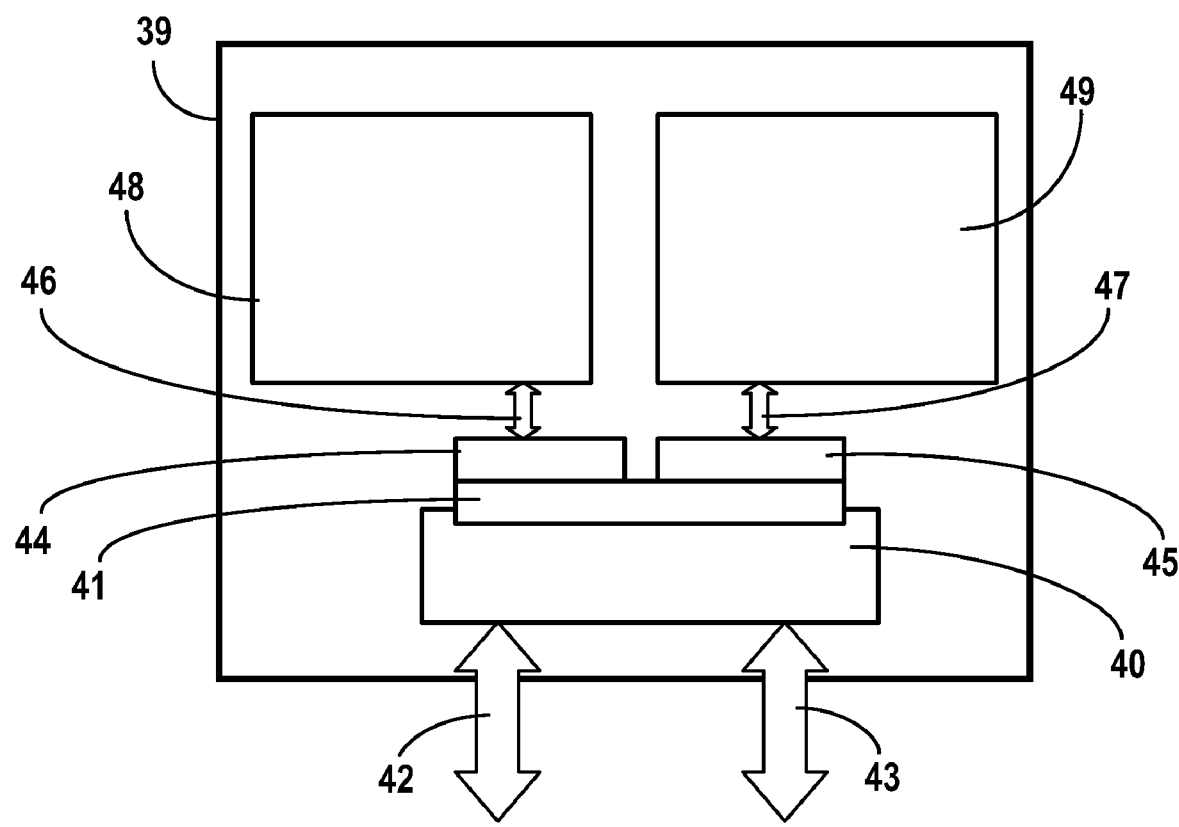
FIG. 4 shows a diagrammatic representation of the interfaces between a local user and a switching unit.

FIG. 4 shows a diagrammatic representation of the interfaces between a local user and a switching unit. According to the disclosed invention, the switching unit 40 is integrated in the user 39, for example a control computer 1 of an automation system. The user 39 participates both in the real-time-critical communication and in the non-real-time-critical communication which is why real-time-critical applications 48, for example for controlling drives of an automation system, and non-real-time-critical applications 49, for example browsers for spontaneous Internet communication or word processing programs, are installed in the user 39. For reasons of clarity, only logical connections and no physical connections, especially data connections, are shown. Communication between user 39 and integrated switching unit 40 takes place via the local memory 41 in which the corresponding data transmitted by the user 39 or intended for the user 39 are temporarily stored. Both the user 39 and the switching unit 40 must be able to access the local memory 41, the physical location of the local memory 41 which is, for example, part of the switching unit 40 in the exemplary embodiment shown, is of no significance in this connection. To guarantee the separation between real-time-critical communication and non-real-time-critical communication, and thus interference-free real-time communication, two separate accesses to user 39 are required, one access being intended for the exchange of real-time-critical data and the other access being intended for the exchange of non-real-time-critical data. As a consequence, the physical communication takes place via two separate logical interfaces 42 and 43 between the data network, not shown for reasons of clarity, and the switching unit 40, and the logically separated communication channels 46 and 47 between the memory 41, i.e. the switching unit 40, and the user 39. The interface 42 and the communication channel 46 characterize the communication channels for the real-time-critical communication and the interface 43 and the communication channel 47 characterize the communication channels for the non-real-time-critical communication. Considered physically, however, the two logically separated interfaces 42 and 43 shown in each case and the communication channels 46 and 47 are in each case the same communication channel which is used for conveying the respective data in both directions. In particular, the separate signaling of which type of data are present and can be retrieved takes place via the two logically separated communication channels 46 and 47, the provision of real-time-critical data for the real-time-critical applications 48 being signaled via communication channel 46 and the provision of non-real-time-critical data for the non-real-time-critical applications 49 being signaled via communication channel 47. Thus, driver 44 and the real-time-critical applications 48 can be processed with a higher priority than driver 45 and the non-real-time-critical applications 49. Thus, the real-time-capable processing of real-time-critical data can also be guaranteed in user 39. In addition, separating the real-time-critical communication and the non-real-time-critical communication, which is necessary for guaranteeing the real-time communication, has the advantage that existing programs, especially existing drivers, can be used without restriction for the non-real-time-critical communication as a result of which, on the one hand, no expensive new developments are necessary and, on the other hand, the further evolution of the non-real-time-critical standard communication has no influence on the real-time communication itself and can therefore be included in the disclosed invention without any restriction.

In summary, the invention relates to a system and a method which, due to a cyclic operation, provides both for a real-time-critical communication and a non-real-time-critical communication in a switched data network consisting of users and switching units, for example of a distributed automation system. In a so-called transmission cycle (12), there is in each case at least one section (13) for transmitting real-time-critical data and at least one section (14) for transmitting non-real-time-critical data for all users and switching units of the switched data network, as a result of which the real-time-critical communication is separated from the non-real-time-critical communication. Since all users and switching units are always synchronized to a common time base, the respective sections for transmitting data in each case occur at the same time for all users and switching units, i.e. the real-time-critical communication takes place independently in time from the non-real-time-critical communication and is, therefore, not influenced by the latter. The real-time-critical communication is planned in advance. Feeding-in of the data telegrams at the original transmitter and forwarding them by means of the switching units involved takes place in a timing-based manner. Temporary storage in the respective switching units has the result that spontaneous Internet-capable non-real-time-critical communication occurring at an arbitrary time is shifted into the transmission section (14) of a transmission cycle (12) which is intended for the non-real-time-critical communication and is also only transmitted there.

While the exemplary embodiments illustrated in the FIGS. and described above are presently preferred, it should be understood that these embodiments are offered by way of example only. Accordingly, the present invention is not limited to a particular embodiment, but extends to various modifications that nevertheless fall within the scope of the appended claims.

The invention claimed is:

1. A method of communicating in a distributed, industrial automation system, comprising:
   providing a plurality of user devices and a plurality of Ethernet switching units, wherein an Ethernet switching unit is integrated in each user device;
   operating the plurality of Ethernet switching units via a common synchronous time base,
   wherein a communication between the plurality of user devices and Ethernet switching units is effected in transmission cycles,
   wherein each transmission cycle is subdivided into a first section for transmitting real-time-critical data and a second section for transmitting non-real-time-critical data, and
   wherein, for each transmission cycle, a length of the second section for transmitting non-real-time-critical data is automatically established by a length of the first section for transmitting real-time-critical data;
   receiving at an Ethernet switching unit real-time-critical data for a user device of the distributed, industrial automation system;
   transmitting the real-time-critical data to the user device during the first section of the transmission cycle intended for transmission of real-time-critical data;
   receiving at the Ethernet switching unit non-real-time-critical data during the transmission of the real-time-critical data;
   storing the non-real-time critical data in a memory of the user device or the Ethernet switching unit;
   transmitting the non-real-time critical data to a receiver during the second section of the transmission cycle intended for transmission of non-real-time critical data.

2. The method of claim 1, wherein a period of the transmission cycle is established at least once before transmitting the real-time-critical data.

3. The method of claim 1, further comprising transmitting data for the organization of the data transmission at a beginning of the first section.

4. The method of claim 3, wherein all Ethernet switching units in a network schedule transmissions according to the transmission cycle having first and second sections.

* * * * *